Nov. 19, 1968    R. A. GLADSTONE ET AL    3,411,537
FLUID DIVERTING VALVE
Filed Dec. 15, 1966
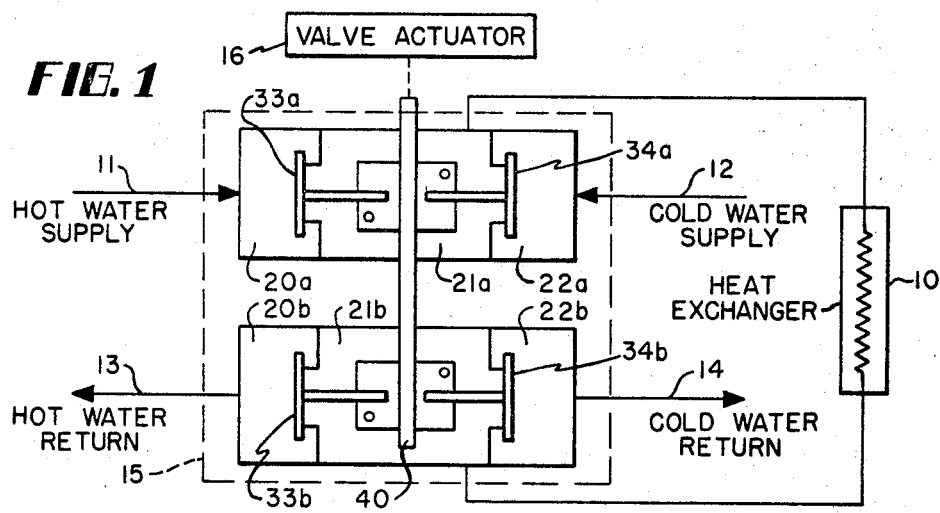
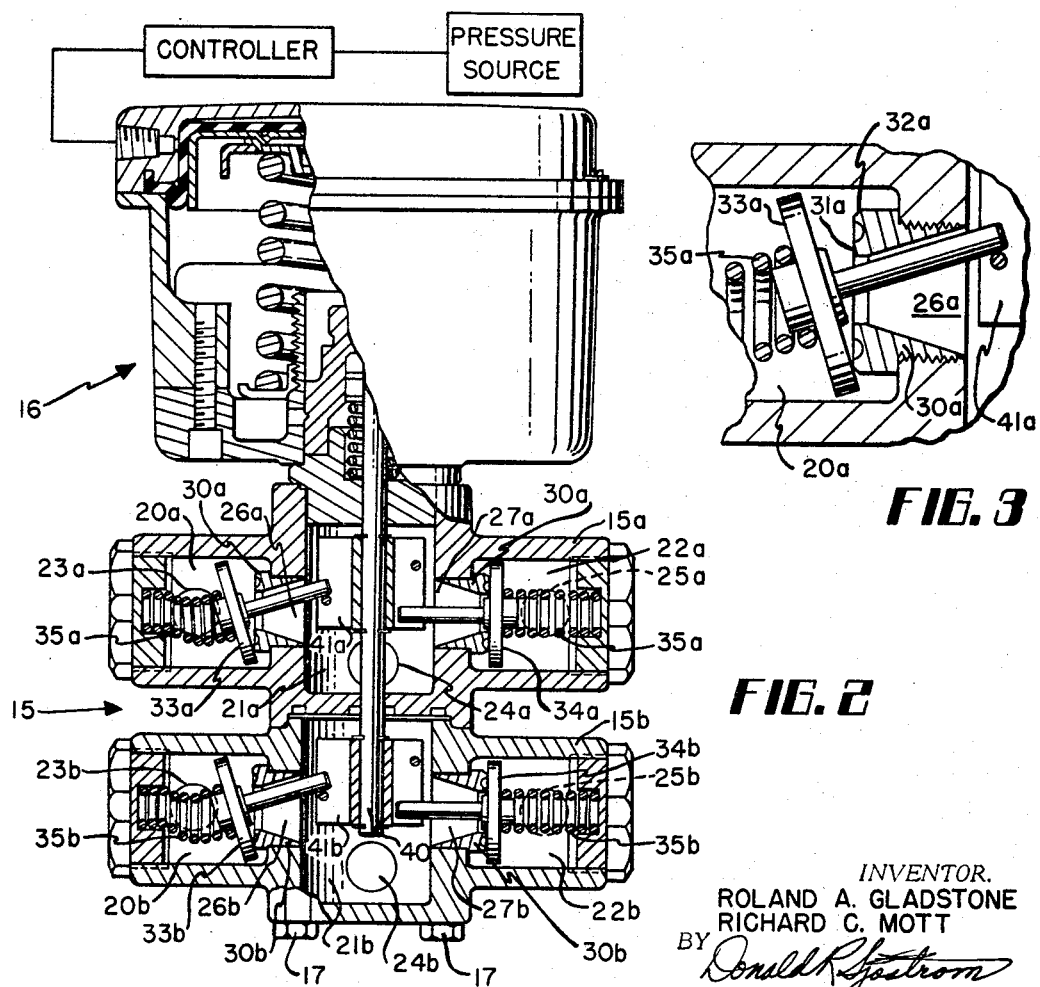
INVENTOR.
ROLAND A. GLADSTONE
RICHARD C. MOTT
BY Donald R. Sjostrom
ATTORNEY United States Patent Office 3,411,537
Patented Nov. 19, 1968

3,411,537
FLUID DIVERTING VALVE
Roland A. Gladstone, Chicago, and Richard C. Mott, Harwood Heights, Ill., assignors to Honeywell Inc., Minneapolis, Minn., a corporation of Delaware
Filed Dec. 15, 1966, Ser. No. 601,944
10 Claims. (Cl. 137—597)

ABSTRACT OF THE DISCLOSURE

A four-pipe temperature conditioning system including heating and cooling fluid supplies, each with its own return, and a common heat exchanger utilized for both heating and cooling, and further including a unitary six-port fluid diverting valve having a plurality of tilting poppet valves selectively and sequentially operable by a single valve actuator to connect the heat exchanger across either the heating fluid supply and return or the cooling fluid supply and return, or to completely interrupt fluid flow to the heat exchanger.

Background of the invention

This invention relates to fluid diverting valves for controlling the flow of temperature conditioning fluid to a heat exchanger. Specifically, it relates to a unitary six-port diverting valve for use in four-pipe heating and cooling systems.

In the past, four-pipe heating and cooling systems have generally employed two three-way valves, one for controlling the flow of fluid to a heat exchanger and another controlling its return. This required two operators controlled to operate cooperatively, or required a single actuator with appropriate linkage connecting the two valves to it. Either arrangement was relatively expensive, required a substantial amount of space and was relatively difficult, and therefore costly, to install. The advantages of a unitary valve have been realized but their use was limited by the requirement that proper sequencing was essential. Specially constructed spool valves have been utilized but these are disadvantageous because they require a substantial operating force, and because they tend to be rendered inoperative by the accumulation of scale and the like from the conditioning fluids.

Brief summary of invention

The valve of this invention is simple in construction, relatively compact, and is relatively easily installed. It utilizes a single actuator and requires only a relatively small operating force. It is constructed so that the effect of impurities deposited from the fluid is substantially reduced.

The valve has a valve body which includes six chambers, each of which has an external port. The first and second, and the second and third, chambers are connected by control ports each of which has a valve seat associated with it. Similarly, the fourth and fifth, and the fifth and sixth, chambers are connected by control ports, each having an associated valve seat. Each of the valve seats has associated therewith a poppet valve which has a stem. The stems of the valves associated with the second chamber extend into the second chamber while the stems of the valves associated with the fifth chamber extend thereinto. Each of these poppet valves is resiliently urged into engagement with its valve seat to close the associated control port. An actuating means for the valve includes cam means cooperable with the stems of the poppet valves and movable between a position wherein one pair of poppet valves (one poppet valve associated with the second chamber and one associated with the fifth chamber) is open while another pair is closed, and a second position wherein the first pair is closed and the second pair is open. In a preferred form of the invention, the poppet valves are arranged so that they are tilted off their respective valve seats, as distinguished from being moved longitudinally away from their valve seats, as they are opened.

Description of drawing

FIGURE 1 is a schematic representation of a four-pipe temperature conditioning system utilizing a fluid diverting valve (also shown schematically) constructed according to this invention.

FIGURE 2 is an elevational view, partly in cross-section, disclosing in detail the structure of the fluid diverting valve.

FIGURE 3 is an exploded fragmentary view of a portion of the valve disclosed in FIGURE 2.

Detailed description

FIGURE 1 discloses schematically a temperature conditioning system for controlling the flow of heating and cooling fluid to a heat exchanger 10. These fluids are supplied through hot and cold water supplies 11 and 12, respectively and are returned through hot and cold water returns 13 and 14, respectively. It will be appreciated that any heating and cooling fluids may be used and that reference is made to the use of water here by way of example and not as a limitation. The flow of these fluids is controlled by a fluid diverting valve having a body 15 and an actuator 16.

The construction of the preferred embodiment of the diverting valve can best be appreciated by referring to FIGURE 2 wherein the preferred construction thereof is shown in detail. Body 15 includes two substantially identical portions, 15a and 15b, which are mounted one on top of the other and fastened together by appropriate means such as bolts 17, the heads of which can be seen at the bottom of the figure. Since the two portions of the body are substantially identical, similar numerals will be used herein for designating similar parts of the two bodies with the letter $a$ being used to designate parts of the upper body portion and the letter $b$ to designate parts of the lower body portion. Upper body portion 15a and associated elements will be described in detail with the understanding that the description applies to portion 15b and associated elements unless otherwise indicated.

Body portion 15a includes three chambers 20a, 21a, and 22a, which may be referred to as the first, second and third chambers thereof, respectively. Chamber 21a is a central chamber and is cylindrical in shape with a longitudinal axis at its center. Chambers 20a and 22a are formed at opposite sides of chamber 21a and are also cylindrical in shape with a common longitudinal axis which intersects and is substantially perpendicular to the axis of chamber 21a. Each of the chambers 20a, 21a and 22a, has an external port designated 23a, 24a, and 25a, respectively.

Chamber 20a is connected to chamber 21a by a control port 26a and chamber 22a is connected to chamber 21a by a control port 27 (see FIGURE 2). Each of these control ports has associated therewith a valve seat which, in the preferred form, is provided by a member 30a, one of which is associated with each of the control ports. Members 30a, as can best be seen in FIGURE 3, may be secured to the valve body by appropriate means such as threading. Each includes an annular seating surface 31a immediately around the control port and coaxial with surface 31a and with a somewhat greater diameter, an annular pivot surface 32a which preferably is recessed slightly from the plane of surface 31a. The passage through each of the members 30a is frusto-conical so that it is divergent toward chamber 21a. Chambers 20a and 22a have disposed therein poppet valves 33a and 34a, respectively. Each of these poppet valves is urged into engagement with the associated valve seat by appropriate resilient means such as springs 35a, one of which is disposed in each of the first and third chambers. Each of the poppet valves has a disc-shaped portion which is greater in diameter than the diameter of the pivot surface 32a and each of the poppet valves has a longitudinally extending stem which extends through the associated control port into the central chamber 21a.

As seen in FIGURES 1 and 2, body portions 15a and 15b are aligned so that their control chambers 21a and 21b are aligned on a common axis. Ports 24a and 24b are adapted to be connected to opposite ends of heat exchanger 10. Ports 23a and 23b may be connected to the hot water supply and return, respectively, while ports 25a and 25b may be connected to the cold water supply and returns, respectively. Valves 33a and 33b act as a first pair of valves controlling hot water flow while valves 34a and 34b act as a second pair of valves controlling cold water flow.

Slidably extending in chamber 21a and 21b along their longitudinal axis, is an actuating rod 40. Rod 40 is operably connected, by appropriate means (not shown), to the valve actuator means 16. As illustrated in FIGURE 2, a conventional pneumatic actuator may be utilized. Obviously, various other types of actuators, such as rotary motor driven, fluid-filled bulb and bellows, electric solenoid, or various other types of actuators may be used. Rod 40 has mounted thereon, in chambers 21a and 21b, cam means 41a and 41b, respectively, which may include a central sleeve portion with a pair of diametrically opposed flat wing-like members, each of which has mounted thereon a laterally extending pin. These pins are so disposed that, in a central position (as illustrated in FIGURE 1) neither of the poppet valve stems is engaged by the cam means and springs 35 are permitted to close each of the poppet valves against its seat. At one extreme position (as disclosed in FIGURE 2) the first pair of poppet valves 33a and 33b are engaged by the cam means and tilted about surface 32 to open control passages 26a and 26b. In the other extreme position of the actuating means, where member 40 is moved longitudinally downward from the position disclosed in FIGURE 2, the stems of the first pair of poppet valves are released so that these valves close and then further movement to the opposite extreme position results in engagement of the stems of the second pair of poppet valves 34a and 34b by the cam means so that they are pivoted about surfaces 32a and 32b to open control passages 27a and 27b. The frusto-conical shape of the control ports is desirable to facilitate tilting of the poppet valves. The valves may have an appropriately shaped flow characterizing portion surrounding the stem and extending into the control passages as illustrated.

When rod 40 occupies an intermediate position, as shown in FIGURE 1, all of the poppet valves are closed and prevent the flow of either heating or cooling fluids to the heat exchanger 10. When the valve is in its first extreme position, as disclosed in FIGURE 2, hot water flows into chamber 20a by means of external port 23b, then flows through control port 26a into chamber 21a, and through external port 24a to the heat exchanger. It returns from the heat exchanger through external port 24b into chamber 21b and then through port 26b into chamber 20b and through external port 23b to the hot water return. In the other extreme position, the cold water flows to the heat exchanger in a similar manner through control ports 27a and 27b.

The construction described above results in a valve which is relatively simple in construction and is compact due to its unitary nature. The use of the poppet valves, particularly when used so that they are tilted open rather than moved longitudinally from their seats, provides a valve which requires a minimum amount of force for operation. Also, with this construction there is relatively little effect upon the operation of the valve due to the collection of scale or other deposited materials by the heating and cooling fluid. These distinct advantages over prior diverting valves render our valve particularly useful in heating and cooling systems such as that disclosed in FIGURE 1.

We have described in detail a preferred embodiment of a valve constructed according to our invention. This description is for the purpose of illustration of the invention, and various modifications may be apparent to those skilled in the art in view of our disclosure herein. Therefore, it should be understood that the invention is to be limited solely by the scope of the appended claims.

The embodiments of the invention in which an exclusive property or right is claimed are defined as follows:

1. A six-port fluid diverting valve comprising:
   valve body means having first, second, third, fourth, fifth, and sixth chambers each having an external port;
   first, second, third, and fourth control ports connecting said first and second, said second and third, said fourth and fifth, and said fifth and sixth chambers, respectively;
   first, second, third, and fourth valve seats associated with said first, second, third and fourth control ports, respectively;
   first and second poppet valves cooperable with said first and second valve seats, respectively, and operable to control fluid flow through said first and second control ports, respectively, each of said poppet valves having a stem portion in said second chamber;
   third and fourth poppet valves cooperable with said third and fourth valve seats, respectively, and operable to control fluid flow through said third and fourth control ports, respectively, each of said third and fourth poppet valves having a stem in said fifth chamber;
   means resiliently urging each of said poppet valves into sealing engagement with its valve seat;
   said first and third poppet valves and said second and fourth poppet valves constituting first and second pairs of poppet valves, respectively;
   actuating means including cam means in said second and fifth chambers and cooperable with the stems of said poppet valves, said cam means being movable between a first position wherein said cam means operably engages the stems of said first pair of poppet valves and thereby operates said first pair of poppet valves to open said first and third control ports without affecting the position of said second pair of poppet valves, and a second position wherein said cam means is operably disengaged from the stems of said first pair of poppet valves and operably engages the stems of said second pair of poppet valves and thereby operates said second pair of poppet valves to open said second and fourth control ports.

2. The diverting valve of claim 1 wherein the valve is adapted to be connected into a heating and cooling system with the external port of one of said first and fourth chambers connected to a heating fluid supply, the external port of the other of said first and fourth chambers connected to a heating fluid return, the external port of one of said third and sixth chambers connected to a cooling fluid supply, the external port of the other of said third and sixth chambers connected to a cooling fluid return, and with the external ports of said second and fifth chambers connected to opposite ends of a heat exchanger.

3. The diverting valve of claim 1 wherein said valve body means includes first and second substantially identical body portions which are rigidly connected together; wherein said first body portion includes said first, second, and third chambers; and wherein said second body portion includes said fourth, fifth, and sixth chambers.

4. The diverting valve of claim 3 wherein said first pair of poppet valves is disposed with one valve in said first chamber with its stem portion extending through said first control port into said second chamber and the other valve in said fourth chamber with its stem portion extending through said third control ports into said fifth chamber; wherein said second pair of poppet valves is disposed with one valve in said third chamber with its stem portion extending through said second control port into said second chamber and the other valve in said sixth chamber with its stem portion extending through said fourth control port in said fifth chamber; wherein said actuating means includes cam means sealingly disposed in each of said second and fifth chambers and movable therein to selectively operably engage the valve stems extending thereinto to move said poppet valves with respect to their seats; and wherein said actuating means further includes means for externally operating said actuating means to simultaneously operate the cam means in said second and fifth chamber.

5. The diverting valve of claim 4 wherein said poppet valves, said valve seats and said actuating means are constructed and arranged so that operation of said poppet valves by said actuating means tilts said valves away from said seats to open said control ports.

6. The diverting valve of claim 1 wherein said valve body means includes first and second body portions which are substantially alike with said first portion including said first, second, and third chambers and said second portion including said fourth, fifth, and sixth chambers; wherein the second and fifth chambers are generally cylindrical in shape with a common longitudinal axis; wherein said first and third chambers are generally cylindrical in shape, are disposed on opposite sides of said second chamber, and have a common longitudinal axis which intersects, and is generally perpendicular to, the longitudinal axis of said second and fifth chambers; wherein said fourth and sixth chambers are generally cylindrical in shape, are disposed on opposite sides of said fifth chamber, and have a common longitudinal axis which intersects, and is generally perpendicular to, the longitudinal axis of said second and fifth chambers; and wherein said actuating means includes cam means disposed in said second and fifth chambers and movable in a direction generally parallel to the longitudinal axis of said second and fifth chambers.

7. The diverting valve of claim 6 wherein said first pair of poppet valves is disposed with one valve in said first chamber with its stem portion extending through said first control port into said second chamber and the other valve in said fourth chamber with its stem portion extending through said third control port into said fifth chamber; wherein said second pair of poppet valves is disposed with one valve in said third chamber and each having its stem portion extending through said second control port into said second chamber and the other valve in said sixth chamber with its stem portion extending through said fourth control port into said fifth chamber; wherein the first and second body portions are disposed so that said second and fifth chambers thereof are axially displaced along said common longitudinal axis; and wherein said actuating means includes means operably connecting the cam means in each of said second and fifth chambers so that said cam means in said second and fifth chambers move simultaneously.

8. The diverting valve of claim 7 wherein said poppet valves, said valve seats and said actuating means are so constructed and arranged that said poppet valves are tilted away from their seats when operated by said cam means.

9. The diverting valve of claim 8 wherein said first and second control ports are divergent toward said second chamber and said third and fourth control ports are divergent toward said fifth chamber; wherein each of said valve seats includes an annular seating surface and a second annular surface co-axial with and in a plane generally parallel to the plane of said seating surface, said second surface being of greater diameter than said seating surface; and wherein each of said poppet valves includes a disc-shaped portion of greater diameter than said second annular surface, said disc-shaped portion normally engaging said seating surface to close the associated control passage, and a part of said disc-shaped portion engaging and tilting about a part of said second annular surface when the valve is operated by the actuating means.

10. The diverting valve of claim 9 wherein the cam means of said actuating means is so constructed and arranged, and cooperates with the valve stems in said second and fifth chambers so that in said first position the poppet valves of said first pair are each tilted open by said cam means, and in said second position the poppet valves of said second pair are each tilted open by said cam means, and in an intermediate position said cam means operably disengages all of said poppet valve stems so that all of said poppet valves are seated by said resilient urging means.

References Cited

UNITED STATES PATENTS

| | | | |
|---|---|---|---|
| 448,262 | 3/1891 | Runnels | 137—448 XR |
| 2,336,120 | 12/1943 | Null. | |
| 2,656,145 | 10/1953 | Lawson | 251—254 XR |
| 3,279,867 | 10/1966 | Bueler | 137—627.5 XR |
| 3,332,440 | 7/1967 | Brakebill | 137—595 |
| 3,335,756 | 8/1967 | McPherson | 137—628 |

DONALD E. WATKINS, *Primary Examiner.*